US009832921B2

(12) United States Patent
Anderson et al.

(10) Patent No.: US 9,832,921 B2
(45) Date of Patent: Dec. 5, 2017

(54) TOOLBAR WING SUPPORT SYSTEM FOR AN AGRICULTURAL IMPLEMENT

(71) Applicant: CNH Industrial America LLC, New Holland, PA (US)

(72) Inventors: Brian John Anderson, Yorkville, IL (US); Scott Allen Long, Plainfield, IL (US); Johnathon R. Dienst, Dekalb, IL (US); Michael J. Connors, Lockport, IL (US)

(73) Assignee: CNH Industrial America LLC, New Holland, PA (US)

( * ) Notice: Subject to any disclaimer, the term of this patent is extended or adjusted under 35 U.S.C. 154(b) by 24 days.

(21) Appl. No.: 14/796,917

(22) Filed: Jul. 10, 2015

(65) Prior Publication Data

US 2017/0006761 A1   Jan. 12, 2017

(51) Int. Cl.
*A01B 73/04* (2006.01)
(52) U.S. Cl.
CPC .................... *A01B 73/04* (2013.01)
(58) Field of Classification Search
CPC ........................ A01B 73/00–73/067
See application file for complete search history.

(56) References Cited

U.S. PATENT DOCUMENTS

| 2,597,533 | A | * | 5/1952 | Rogers | ................... | A01B 73/02 |
| | | | | | | 172/674 |
| 2,970,658 | A | | 2/1961 | Kopaska | | |
| 3,154,151 | A | * | 10/1964 | Zimmer | ................. | A01B 73/02 |
| | | | | | | 172/456 |
| 3,208,536 | A | | 9/1965 | Orendorff | | |
| 4,046,203 | A | * | 9/1977 | Ward | ................... | A01B 73/044 |
| | | | | | | 172/456 |
| 4,320,805 | A | | 3/1982 | Winter | | |
| 4,366,867 | A | * | 1/1983 | Filbrun | ................ | A01B 73/065 |
| | | | | | | 172/311 |

(Continued)

FOREIGN PATENT DOCUMENTS

WO    2013134457    9/2013

OTHER PUBLICATIONS

Pioneer, DuPont, "Variation in Corn Yield Across Planter Width," 2011, pp. 1-2, accessed Jun. 23, 2015.

(Continued)

*Primary Examiner* — Robert Pezzuto
*Assistant Examiner* — Adam Behrens
(74) *Attorney, Agent, or Firm* — Rebecca L. Henkel; Rickard K. DeMille

(57) ABSTRACT

An agricultural implement system includes a tow bar assembly configured to couple the agricultural implement system to a tow vehicle. The agricultural implement system also includes a toolbar assembly coupled to the tow bar assembly. The toolbar assembly includes a first wing toolbar configured to support a first row unit, the first wing toolbar is configured to rotate about a first axis relative to the tow bar assembly to enable the toolbar assembly to bend in response to variations in a surface of soil, and no ground engaging wheel is coupled to the first wing toolbar. The agricultural implement system also includes an actuator configured to rotate the first wing toolbar upwardly about the first axis while the toolbar assembly is in a raised position such that the first row unit is disengaged from soil.

19 Claims, 4 Drawing Sheets

(56) References Cited

U.S. PATENT DOCUMENTS

| | | | | |
|---|---|---|---|---|
| 4,569,296 A | * | 2/1986 | Miller | A01B 73/005 111/123 |
| 4,646,851 A | | 3/1987 | Duello | |
| 4,664,202 A | | 5/1987 | Applequist et al. | |
| 4,739,930 A | * | 4/1988 | Pask | A01M 7/0075 239/161 |
| 4,945,997 A | | 8/1990 | Adee | |
| 5,113,956 A | | 5/1992 | Friesen et al. | |
| 5,429,195 A | | 7/1995 | Turnis | |
| 5,687,798 A | * | 11/1997 | Henry | A01C 7/205 172/311 |
| 5,934,382 A | * | 8/1999 | Wilkins | A01B 39/08 172/460 |
| 6,035,942 A | * | 3/2000 | Smith | A01B 59/00 111/57 |
| 6,205,106 B1 | | 3/2001 | Toth | |
| 6,206,105 B1 | * | 3/2001 | Friesen | A01B 73/065 111/54 |
| 6,213,034 B1 | | 4/2001 | Raducha et al. | |
| 6,321,852 B1 | | 11/2001 | Pratt | |
| 7,604,068 B1 | * | 10/2009 | Friesen | A01B 73/065 172/311 |
| 2005/0211144 A1 | | 9/2005 | Gust et al. | |
| 2006/0150604 A1 | * | 7/2006 | Kieffer | A01B 63/10 56/15.8 |
| 2011/0315410 A1 | | 12/2011 | Kinzenbaw | |
| 2012/0000404 A1 | * | 1/2012 | Remoue | A01B 63/22 111/9 |
| 2013/0048322 A1 | | 2/2013 | Tamm et al. | |
| 2013/0081830 A1 | * | 4/2013 | Tuttle | A01B 63/22 172/1 |
| 2013/0233580 A1 | * | 9/2013 | Kinzenbaw | A01B 73/065 172/1 |

OTHER PUBLICATIONS http://www..kinze.com/filesimages/Literature/4900.pdf, Kinze 4900 Planter, Kinze Manufacturing, Inc., pp. 1-36, accessed May 26, 2015.

* cited by examiner

US 9,832,921 B2

TOOLBAR WING SUPPORT SYSTEM FOR AN AGRICULTURAL IMPLEMENT

BACKGROUND

The invention relates generally to a toolbar wing support system for an agricultural implement.

Generally, seeding implements (e.g., seeders) are towed behind a tractor or other work vehicle via a mounting bracket secured to a rigid frame of the implement. Seeding implements typically include multiple row units distributed across a width of the implement. Each row unit is configured to deposit seeds at a desired depth beneath the soil surface of a field, thereby establishing rows of planted seeds. For example, each row unit typically includes a ground engaging tool or opener that forms a seeding path (e.g., trench) for seed deposition into the soil. The opener is followed by a seed tube configured to direct seeds and/or other agricultural products (e.g., fertilizer, etc.) into the trench. Closing discs may be positioned behind the seed tube for moving the soil back into the trench, and/or a packer wheel may be coupled to a rear portion of the row unit to pack the soil on top of the deposited seeds.

In certain seeding implements, the row units are mounted along a toolbar assembly. Certain toolbar assemblies include wing toolbars that are configured to rotate relative to a central portion of the implement, thereby enabling the toolbar assembly to bend in response to variations in the soil surface. In addition, each wing toolbar may be configured to rotate forwardly relative to the central portion of the implement, thereby enabling each wing toolbar to transition between a working position and a transport portion. Each wing toolbar typically includes at least one wheel configured to support the wing toolbar at least during the transition between the working position and the transport position and while the toolbar assembly is in a raised position for turning at a headland, for example. Unfortunately, the wing support wheels may compact the soil as the wheels engage the ground, thereby reducing crop yields.

BRIEF DESCRIPTION

In one embodiment, an agricultural implement system includes a tow bar assembly configured to couple the agricultural implement system to a tow vehicle. The agricultural implement system also includes a toolbar assembly coupled to the tow bar assembly. The toolbar assembly includes a first wing toolbar configured to support a first row unit, the first wing toolbar is configured to rotate about a first axis relative to the tow bar assembly to enable the toolbar assembly to bend in response to variations in a surface of soil, the first wing toolbar is configured to rotate about a second axis, different from the first axis, relative to the tow bar assembly to enable the first wing toolbar to transition between a working position, in which the first wing toolbar is substantially perpendicular to a direction of travel of the agricultural implement system, and a transport position, in which the first wing toolbar is folded forwardly along the direction of travel relative to the tow bar assembly, and no ground engaging wheel is coupled to the first wing toolbar. In addition, the agricultural implement system includes a first actuator configured to move the toolbar assembly between a lowered position and a raised position. The first row unit is configured to engage the soil while the toolbar assembly is in the lowered position and the first wing toolbar is in the working position. The agricultural implement system also includes a second actuator configured to rotate the first wing toolbar upwardly about the first axis while the toolbar assembly is in the raised position such that the first row unit is disengaged from the soil.

In another embodiment, an agricultural implement system includes a first hydraulic actuator configured to move a toolbar assembly between a lowered position and a raised position. The agricultural implement system also includes a second hydraulic actuator configured to rotate a first wing toolbar of the toolbar assembly about a first axis relative to a tow bar assembly. The first wing toolbar is configured to support a first row unit, the first wing toolbar is configured to rotate about the first axis to enable the toolbar assembly to bend in response to variations in a surface of soil, the first wing toolbar is configured to rotate about a second axis, different from the first axis, between a working position, in which the first wing toolbar is substantially perpendicular to a direction of travel of the agricultural implement system, and a transport position, in which the first wing toolbar is folded forwardly along the direction of travel relative to the tow bar assembly, and no ground engaging wheel is coupled to the first wing toolbar. In addition, the agricultural implement system includes a first sensor configured to output a first signal indicative of a first angle of the first wing toolbar relative to the tow bar assembly about the first axis. The agricultural implement system further includes a hydraulic control system having an electronic controller. The hydraulic control system is fluidly coupled to the first hydraulic actuator and to the second hydraulic actuator, the electronic controller is communicatively coupled to the first sensor and configured to receive the first signal, and the electronic controller is configured to instruct the second hydraulic actuator to rotate the first wing toolbar upwardly about the first axis while the toolbar assembly is in the raised position until the first angle of the first wing toolbar is greater than or equal to a first threshold angle in which the first row unit is disengaged from the soil.

In a further embodiment, an agricultural implement system includes a tow bar assembly configured to couple the agricultural implement system to a tow vehicle. The agricultural implement system also includes a toolbar assembly having a first wing toolbar and a first wing support. The first wing toolbar is configured to support a first row unit, the first wing toolbar is rotatably coupled to the first wing support, the first wing toolbar is configured to rotate about a first axis relative to the first wing support to enable the toolbar assembly to bend in response to variations in a surface of soil, the first wing support is rotatably coupled to the tow bar assembly and configured to rotate about a second axis, different from the first axis, relative to the tow bar assembly to enable the first wing toolbar to transition between a working position, in which the first wing toolbar is substantially perpendicular to a direction of travel of the agricultural implement system, and a transport position, in which the first wing toolbar is folded forwardly along the direction of travel relative to the tow bar assembly, and no ground engaging wheel is coupled to the first wing toolbar. In addition, the agricultural implement system includes a first actuator configured to move the toolbar assembly between a lowered position and a raised position. The first row unit is configured to engage the soil while the toolbar assembly is in the lowered position and the first wing toolbar is in the working position. The agricultural implement system further includes a second actuator extending between the first wing support and the first wing toolbar. The second actuator is configured to rotate the first wing toolbar upwardly about the first axis while the toolbar assembly is in the raised position such that the first row unit is disengaged from the soil.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
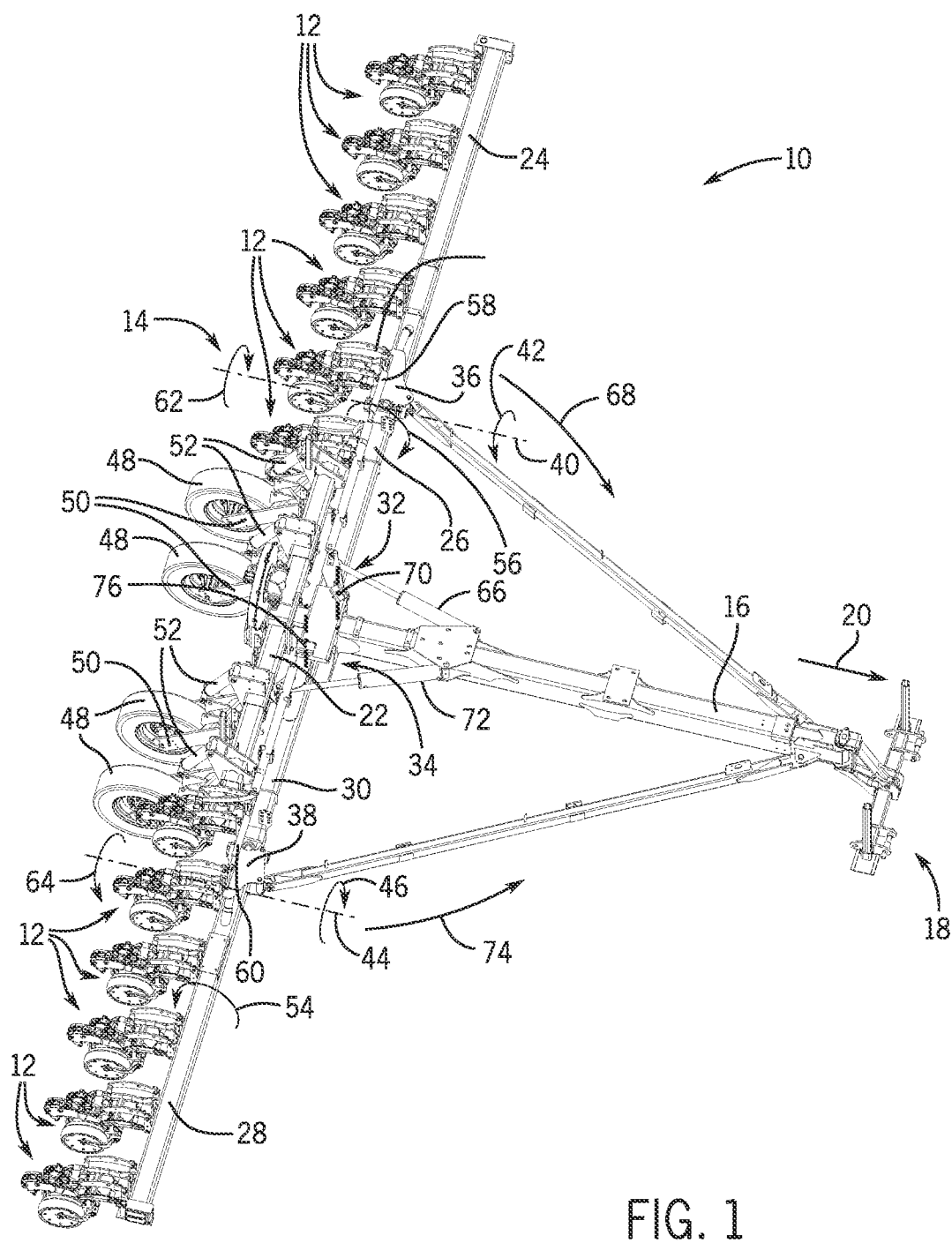
FIG. 1 is a perspective view of an embodiment of an agricultural implement system configured to deposit seeds into soil.

Turning now to the drawings, FIG. 1 is a perspective view of an embodiment of an agricultural implement system 10 configured to deposit seeds into soil. In the illustrated embodiment, the agricultural implement system 10 includes row units 12 configured to open the soil, dispense seeds into the soil opening, and re-close the soil as the implement system 10 moves through a field. For example, in certain embodiments, each row unit 12 includes a ground engaging tool or opener that forms a seeding path (e.g., trench) for seed deposition into the soil. The opener is followed by a seed tube configured to direct seeds and/or other agricultural products (e.g., fertilizer, etc.) into the trench. Closing discs may be positioned behind the seed tube for moving the soil back into the trench, and/or a packer wheel may be coupled to a rear portion of the row unit to pack the soil on top of the deposited seeds. While the agricultural implement system 10 includes 16 row units 12 in the illustrated embodiment, it should be appreciated that in alternative embodiments, the agricultural implement system may include more or fewer row units. For example, in certain embodiments, the agricultural implement system may include 6, 8, 10, 12, 14, 16, 18, 20, 22, 24, or more row units.

As illustrated, the row units 12 are coupled to a toolbar assembly 14. The toolbar assembly 14, in turn, is coupled to a tow bar assembly 16, which includes a hitch assembly 18. The hitch assembly 18 is configured to couple the agricultural implement system 10 to a tow vehicle, such as a tractor or other prime mover. Accordingly, the tow vehicle may move the agricultural implement system 10 across a field in a direction of travel 20. As discussed in detail below, the tow bar assembly 16 is configured to elongate as wings of the toolbar assembly rotate from the illustrated working position toward a transport position.

In the illustrated embodiment, the toolbar assembly 14 includes a central toolbar 22, a first wing toolbar 24, a first wing support 26, a second wing toolbar 28, and a second wing support 30. The central toolbar 22 is rigidly coupled to the tow bar assembly 16, and the central toolbar 22 is configured to support four row units 12. However, it should be appreciated that the central toolbar may be configured to support more or fewer row units in alternative embodiments. The first and second wing supports 26 and 30 are pivotally coupled to the tow bar assembly 16 by first and second pivot joints 32 and 34, respectively. As discussed in detail below, the first and second pivot joints 32 and 34 enable the wing toolbars and the wing supports to rotate forwardly from the illustrated working position to a transport position. In the illustrated embodiment, one row unit 12 is coupled to each wing support. However, it should be appreciated that in alternative embodiments, more or fewer row units (e.g., 0, 1, 2, 3, 4, or more) may be coupled to each wing support. The first wing toolbar 24 is pivotally coupled to the first wing support 26 by a third pivot joint 36, and the second wing toolbar 28 is pivotally coupled to the second wing support 30 by a fourth pivot joint 38. As discussed in detail below, the third and fourth pivot joints 36 and 38 enable the toolbar assembly 14 to bend in response to variations in the surface of the soil. In the illustrated embodiment, five row units 12 are coupled to each wing toolbar. However, it should be appreciated that more or fewer row units (e.g., 1, 2, 3, 4, 5, 6, 8, 10, or more) may be coupled to each wing toolbar in alternative embodiments.

While the toolbar assembly 14 is in the illustrated lowered position and the wing toolbars are in the illustrated working position, the row units 12 (e.g., ground-engaging elements of the row units, such as gauge wheels, openers, closing discs, packers wheels, etc.) are configured to engage the soil, thereby facilitating planting/seeding operations. In the illustrated embodiment, the toolbar assembly 14 is configured to bend at the third and fourth pivot joints 36 and 38 in response to variations in the surface of the soil. Accordingly, the row units 12 may maintain engagement with the soil as the agricultural implement system 10 encounters varying contours within the field. In the illustrated embodiment, the first wing toolbar 24 is configured to rotate about a first wing axis 40 (e.g., first axis) relative to the first wing support 26 to enable a portion of the toolbar assembly 14 (e.g., left half of the toolbar assembly 14) to bend in response to variations in the surface of the soil. For example, if row units coupled to the first wing toolbar 24 encounter terrain that is elevated relative to the terrain under the central toolbar 22 and/or under the first wing support 26, the first wing toolbar 24 may rotate in a direction 42 about the axis 40. As a result, the row units 12 coupled to the central toolbar 22, the first wing support 26, and the first wing toolbar 24 may maintain engagement with the soil surface.

In addition, the second wing toolbar 28 is configured to rotate about a second wing axis 44 (e.g., third axis) relative to the second wing support 30 to enable a portion of the toolbar assembly 14 (e.g., right half of the toolbar assembly 14) to bend in response to variations in the surface of the soil. For example, if row units coupled to the second wing toolbar 28 encounter terrain that is elevated relative to the terrain under the central toolbar 22 and/or under the second wing support 30, the second wing toolbar 28 may rotate in a direction 46 about the axis 44. As a result, the row units 12 coupled to the central toolbar 22, the second wing support 30, and the second wing toolbar 28 may maintain engagement with the soil surface. In the illustrated embodiment, the first and second wing axes 40 and 44 are substantially parallel to the direction of travel 20. However, it should be appreciated that in alternative embodiments, the first and second wing axes may be angled relative to the direction of travel (e.g., based on the configuration of the third and fourth pivot joints).

In the illustrated embodiment, the agricultural implement system 10 includes four wheels 48 coupled to the central toolbar 22 by respective wheel frames 50. The wheel frames 50 are rotatably coupled to the central toolbar 22 and rotatably coupled to the wheels 48. A wheel actuator 52 (e.g., first actuator), such as a hydraulic actuator or a hydraulic cylinder, among others, is coupled to each wheel frame 50 and to the central toolbar 22 (e.g., via a bracket). The wheel actuators 52 are configured to rotate the respective wheel frames 50 relative to the central toolbar 22. For example, with the toolbar assembly 14 in the illustrated lowered position, the wheel actuators 52 may rotate the wheel frames 50 in the direction 54 (e.g., via extension of hydraulic cylinders), thereby moving the toolbar assembly 14 to a raised position. Furthermore, with the toolbar assembly 14 in the raised position, the wheel actuators 52 may rotate the wheel frames 50 in the direction 56 (e.g., via retraction of hydraulic cylinders), thereby moving the toolbar assembly 14 to the lowered position. With the toolbar assembly 14 in the lowered position, the row units 12 (e.g., ground-engaging elements of the row units, such as gauge wheels, openers, closing discs, packers wheels, etc.) are configured to engage the soil. In addition, transitioning the toolbar assembly 14 to the raised position causes the row units 12 to disengage the soil. The toolbar assembly 14 may be transitioned to the raised position for turning the implement at a headland, or as discussed in detail below, for transitioning the wing toolbars to a transport position.

In the illustrated embodiment, the agricultural implement system 10 includes a first wing actuator 58 (e.g., second actuator), such as a hydraulic actuator or a hydraulic cylinder, among others, extending between the first wing support 26 and the first wing toolbar 28. The first wing actuator 58 is configured to rotate the first wing toolbar 24 upwardly in the direction 42 about the first wing axis 40 while the toolbar assembly 14 is in the raised position such that the row units 12 coupled to the first wing toolbar 24 are disengaged from the soil. For example, the weight of the first wing toolbar 24 and the row units 12 coupled to the first wing toolbar 24 may induce the first wing toolbar 24 to flex downwardly while the toolbar assembly 14 is in the raised position. Accordingly, rotating the first wing toolbar 24 upwardly in the direction 42 may substantially reduce or eliminate the possibility of first wing row units engaging the soil while the toolbar assembly 14 is in the raised position.

In addition, the agricultural implement system 10 includes a second wing actuator 60 (e.g., fourth actuator), such as a hydraulic actuator or a hydraulic cylinder, among others, extending between the second wing support 30 and the second wing toolbar 28. The second wing actuator 60 is configured to rotate the second wing toolbar 28 upwardly in the direction 46 about the second wing axis 44 while the toolbar assembly 14 is in the raised position such that the row units 12 coupled to the second wing toolbar 28 are disengaged from the soil. For example, the weight of the second wing toolbar 28 and the row units 12 coupled to the second wing toolbar 28 may induce the second wing toolbar 28 to flex downwardly while the toolbar assembly 14 is in the raised position. Accordingly, rotating the second wing toolbar 28 upwardly in the direction 46 may substantially reduce or eliminate the possibility of second wing row units engaging the soil while the toolbar assembly 14 is in the raised position.

In certain embodiments and/or operating conditions, the first and second wing actuators 58 and 60 may be transitioned to a float mode while the toolbar assembly 14 is in the lowered position, thereby enabling the wing toolbars to rotate in response to variations in the terrain. However, in alternative embodiments and/or operating conditions, the first and second wing actuators 58 and 60 may urge the respective wing toolbars downwardly while the toolbar assembly 14 is in the lowered position. For example, the first wing actuator 58 may urge the first wing toolbar 24 to rotate in a direction 62 about the first wing axis 40, thereby urging the row units coupled to the first wing toolbar 24 toward the soil surface. In addition, the second wing actuator 60 may urge the second wing toolbar 28 to rotate in a direction 64 about the second wing axis 44, thereby urging the row units coupled to the second wing toolbar 28 toward the soil surface. By way of example, while the agricultural implement 10 is being operated in certain soil conditions (e.g., soft soil), the first and second wing actuators 58 and 60 may be transitioned to the float mode, and while the agricultural implement 10 is being operated in other soil conditions (e.g., hard soil), the first and second wing actuators 58 and 60 may urge the first and second wing toolbars downwardly.

As previously discussed, the first and second wing toolbars 24 and 28, and the first and second wing supports 26 and 30 are configured to rotate between the illustrated working position and a transport position. As illustrated, with the wing toolbars and wing supports in the illustrated working position, the first wing toolbar 24, the first wing support 26, the second wing toolbar 28, and the second wing support 30 are substantially perpendicular to the direction of travel 20. As disclosed herein, "substantially perpendicular" refers to an arrangement in which the wing toolbar and wing support are angled about 45 degrees to about 135 degrees, about 55 degrees to about 125 degrees, about 65 degrees to about 115 degrees, about 75 degrees to about 105 degrees, about 85 degrees to about 95 degrees, or about 90 degrees relative to the direction of travel 20. In the illustrated embodiment, the agricultural implement system 10 includes a first wing support actuator 66 (e.g., third actuator), such as a hydraulic actuator or hydraulic cylinder, among others, extending between the tow bar assembly 16 and the first wing support 26. The first wing support actuator 66 is configured to rotate the first wing support 26 and the first wing toolbar 24 forwardly in a direction 68 about an axis 70 (e.g., second axis) that extends through the first pivot joint 32 (e.g., via retraction of a hydraulic cylinder). In addition, the agricultural implement system 10 includes a second wing support actuator 72 (e.g., fifth actuator), such as a hydraulic actuator or hydraulic cylinder, among others, extending between the tow bar assembly 16 and the second wing support 30. The second wing support actuator 72 is configured to rotate the second wing support 30 and the second wing toolbar 28 forwardly in a direction 74 about an axis 76 (e.g., fourth axis) that extends through the second pivot joint 34 (e.g., via retraction of a hydraulic cylinder).

To transition the first wing toolbar 24, the first wing support 26, the second wing toolbar 28, and the second wing support 30 to the transport position, the wheel actuators 52 move the toolbar assembly 14 to the raised position, thereby disengaging the row units from the soil. The wing support actuators 66 and 72 then rotate the first wing toolbar 24, the first wing support 26, the second wing toolbar 28, and the second wing support 30 forwardly to the transport position. As previously discussed, the first and second wing actuators 58 and 60 are configured to rotate the first and second wing toolbars 24 and 28 upwardly while the toolbar assembly 14 is in the raised position, thereby substantially reducing or eliminating the possibility of the row units engaging the soil while the toolbar assembly 14 is in the raised position. The first and second wing actuators 58 and 60 are also configured to maintain the first and second wing toolbars 24 and 28 in the upwardly rotated position while the wing toolbars and the wing supports rotate forwardly to the transport position. As a result, the possibility of wing toolbar/wing support row units engaging the soil during forward rotation of the wing toolbars and the wing supports is substantially reduced or eliminated.

Because the first and second wing actuators 58 and 60 are configured to maintain the first and second wing toolbars in an upwardly rotated position while the toolbar assembly 14 is in the raised position and during forward rotation of the wing toolbars and the wing supports, wing wheels, which may be employed in certain agricultural implement systems to support the wing toolbars while the toolbar assembly is in the raised position and during the transition to the transport position, are obviated. Accordingly, in the illustrated embodiment, no ground engaging wheel is coupled (e.g., directly coupled, coupled via a wheel frame, etc.) to the first wing toolbar 24 (e.g., along a length/longitudinal extent of the first wing toolbar 24), and no ground engaging wheel is coupled (e.g., directly coupled, coupled via a wheel frame, etc.) to the second wing toolbar 28 (e.g., along a length/longitudinal extent of the second wing toolbar 28). Thus, the first and second wing toolbars are not supported by ground engaging wheels (e.g., while the toolbar assembly is in the raised position, the lowered position, and any position therebetween, and while the wing toolbars are in the working position, the transport position, and any position therebetween). As a result, soil compaction, which may occur as wing wheels engage the soil (e.g., during a headland turn, during the transition to the transport position, etc.), may be substantially reduced or eliminated. In addition, the manufacturing costs associated with the agricultural implement system may be reduced due to a reduction in components. Furthermore, the weight reduction associated with the reduction in components may reduce soil compaction from the wheels 48.

While the illustrated embodiment includes two wing toolbars, i.e., the first wing toolbar 24 and the second wing toolbar 28, it should be appreciated that in alternative embodiments, the toolbar assembly 14 may include additional wing toolbars. For example, in certain embodiments, the toolbar assembly 14 may include 2, 4, 6, 8, or more wing toolbars. In addition, while hydraulic actuators (e.g., hydraulic cylinders) are disclosed herein, it should be appreciated that the wheel actuators 52, the first and second wing actuators 58 and 60, and the wing support actuators 66 and 72 may include pneumatic actuators (e.g., pneumatic cylinders, pneumatic motors, etc.), electric actuators (e.g., solenoids, electric motors, etc.), or any other suitable actuator in alternative embodiments.

Figure 2:
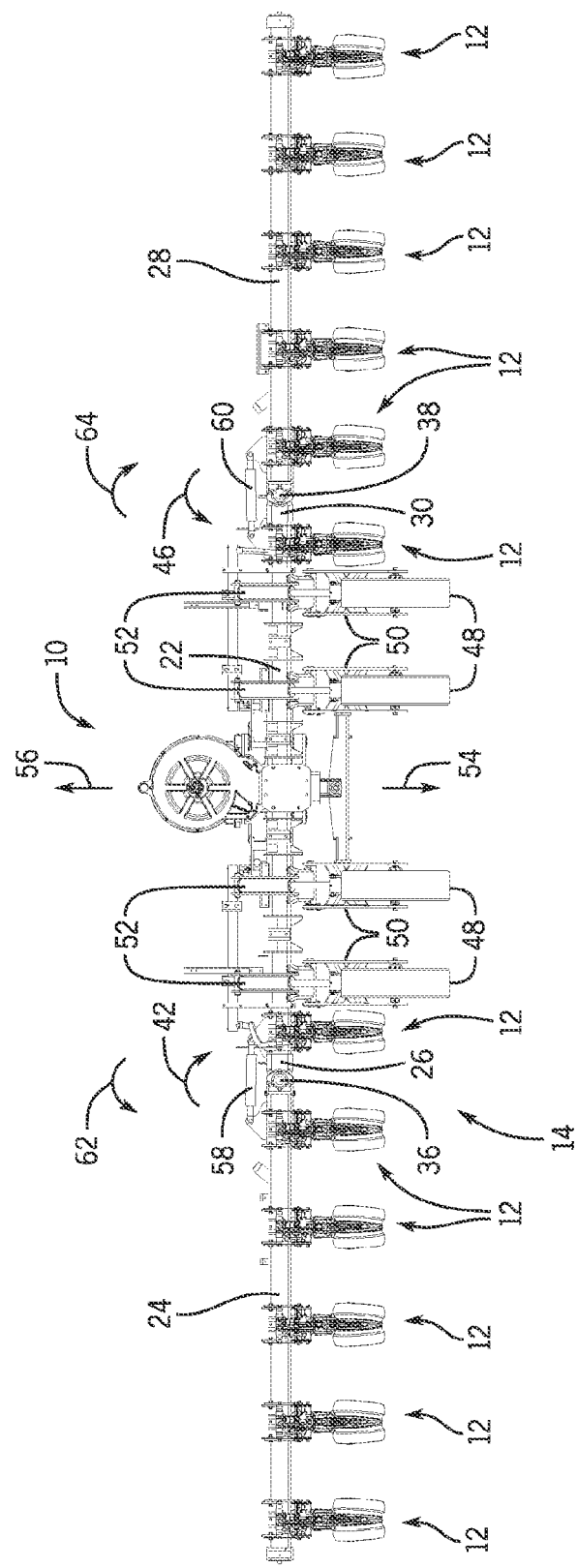
FIG. 2 is a rear view of the agricultural implement system of FIG. 1, in which a toolbar assembly is in a raised position.

FIG. 2 is a rear view of the agricultural implement system 10 of FIG. 1, in which the toolbar assembly 14 is in the raised position. With the toolbar assembly 14 in the raised position, the row units 12 (e.g., ground-engaging elements of the row units, such as gauge wheels, openers, closing discs, packers wheels, etc.) are disengaged from the soil. Disengaging the row units 12 from the soil enables the agricultural implement system 10 to turn at a headland and/or to transition the wing toolbars and the wing supports to the transport position.

As previously discussed, the first wing actuator 58 is configured to rotate the first wing toolbar 24 upwardly in the direction 42 while the toolbar assembly 14 is in the raised position such that the row units 12 coupled to the first wing toolbar 24 are disengaged from the soil. For example, the weight of the first wing toolbar 24 and the row units 12 coupled to the first wing toolbar 24 may induce the first wing toolbar 24 to flex downwardly while the toolbar assembly 14 is in the raised position. Accordingly, rotating the first wing toolbar 24 upwardly in the direction 42 may substantially reduce or eliminate the possibility of first wing row units engaging the soil while the toolbar assembly 14 is in the raised position. Therefore, a wing support wheel, which may be employed in certain agricultural implement systems to support the first wing toolbar while the toolbar assembly is in the raised position, is obviated. As such, no ground engaging wheel is coupled (e.g., directly coupled, coupled via a wheel frame, etc.) to the first wing toolbar 24.

Furthermore, the second wing actuator 60 is configured to rotate the second wing toolbar 28 upwardly in the direction 46 while the toolbar assembly 14 is in the raised position such that the row units 12 coupled to the second wing toolbar 28 are disengaged from the soil. For example, the weight of the second wing toolbar 28 and the row units 12 coupled to the second wing toolbar 28 may induce the second wing toolbar 28 to flex downwardly while the toolbar assembly 14 is in the raised position. Accordingly, rotating the second wing toolbar 28 upwardly in the direction 46 may substantially reduce or eliminate the possibility of second wing row units engaging the soil while the toolbar assembly 14 is in the raised position. Therefore, a wing support wheel, which may be employed in certain agricultural implement systems to support the second wing toolbar while the toolbar assembly is in the raised position, is obviated. As such, no ground engaging wheel is coupled (e.g., directly coupled, coupled via a wheel frame, etc.) to the second wing toolbar 28. Moreover, in the illustrated embodiment, no ground engaging wheel is coupled to the first wing support 26, and no ground engaging wheel is coupled to the second wing support 30.

Figure 3:
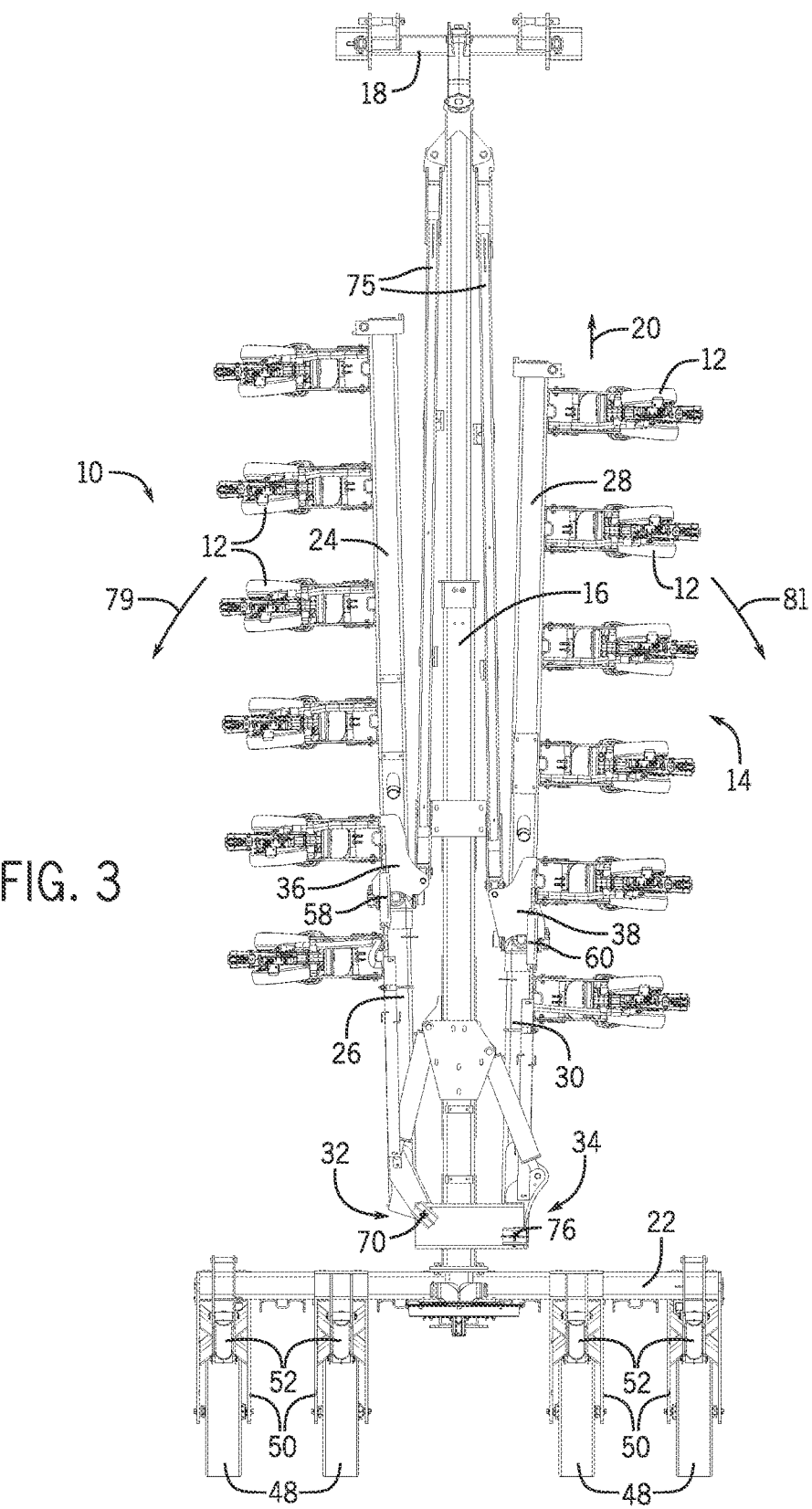
FIG. 3 is a top view of the agricultural implement system of FIG. 1, in which the wing toolbars are in a transport position.

FIG. 3 is a top view of the agricultural implement system 10 of FIG. 1, in which the wing toolbars 24 and 28 are in the transport position. As illustrated, with the wing toolbars in the transport position, the wing toolbars 24 and 28, and the wing supports 26 and 30 are substantially parallel to the direction of travel. In addition, the tow bar 16 is elongated to accommodate the length of the wing toolbars and the wing supports. For example, connecting rods 75 may drive the tow bar 16 to elongate as the wing toolbars 24 and 28, and the wing supports 26 and 30 rotate forwardly. In certain embodiments, the tow bar assembly is configured to support the first wing toolbar 24 and the second wing toolbar 28 while the wing toolbars are in the illustrated transport position. Accordingly, the wing actuators, which maintain the wing toolbars in an upwardly rotated position during forward rotation of the wing toolbars and the wing supports from the working position to the transport position, may be transitioned to a float mode when the wing toolbars and the wing supports reach the transport position.

To transition the wing toolbars 24 and 28 to the working position, the wing actuators 58 and 60 may first raise the wing toolbars above the tow bar assembly 16. The first wing support actuator may then rotate the first wing toolbar 24 and the first wing support 26 outwardly in a direction 79, and the second wing support actuator may rotate the second wing toolbar 28 and the second wing support 30 outwardly in a direction 81. Once the wing toolbars are in the working position, the wheel actuators 52 may lower the toolbar assembly 14 to the lowered position, thereby inducing the row units to engage the soil.

Figure 4:
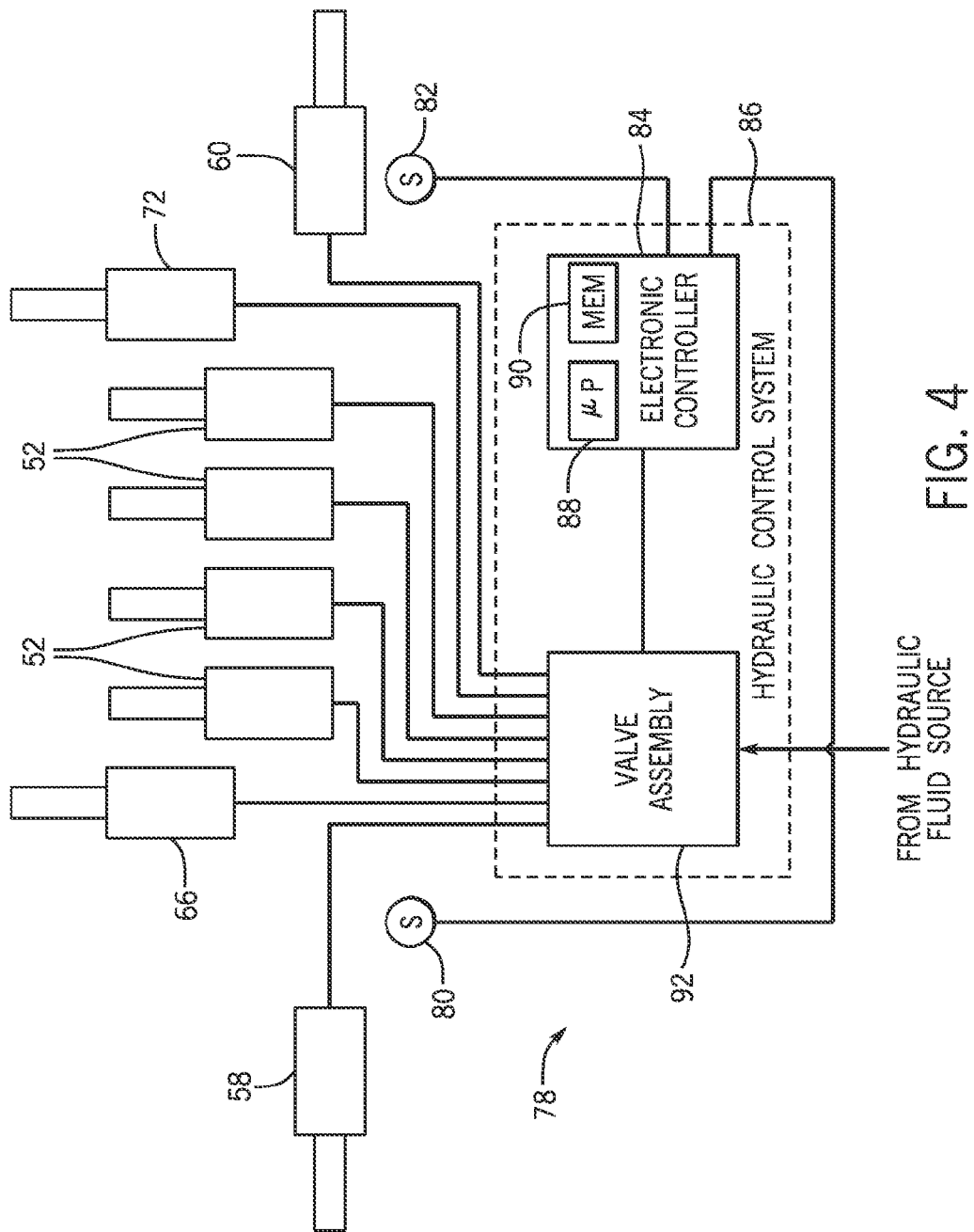
FIG. 4 is a schematic view of a hydraulic system that may be employed within the agricultural implement system of FIG. 1.

FIG. 4 is a schematic view of a hydraulic system 78 that may be employed within the agricultural implement system 10 of FIG. 1. As illustrated, the hydraulic system 78 includes the wheel actuators 52, the first wing actuator 58, the second wing actuator 60, the first wing support actuator 66, and the second wing support actuator 72. As previously discussed, the wheel actuators 52 are configured to move the toolbar assembly between the lowered position and the raised position. In addition, the first wing actuator 58 is configured to rotate the first wing toolbar about the first wing axis, and the second wing actuator 60 is configured to rotate the second wing toolbar about the second wing axis. Furthermore, the first wing support actuator 66 is configured to rotate the first wing toolbar between the working position and the transport position, and the second wing support actuator 72 is configured to rotate the second wing toolbar between the working position and the transport position. While each actuator is a hydraulic cylinder in the illustrated embodiment, it should be appreciated that in alternative embodiments, one or more of the actuators may be a hydraulic motor or any other suitable hydraulic actuator.

In the illustrated embodiment, the hydraulic system 78 includes a first sensor 80 and a second sensor 82. Each sensor 80 and 82 is communicatively coupled to an electronic controller 86 of a hydraulic control system 86. The first sensor 80 is configured to output a first signal indicative of a first angle of the first wing toolbar relative to the tow bar assembly (e.g., relative to the first wing support, which is coupled to the tow bar assembly) about the first wing axis. In addition, the second sensor 82 is configured to output a second signal indicative of a second angle of the second wing toolbar relative to the tow bar assembly (e.g., relative to the second wing support, which is coupled to the tow bar assembly) about the second wing axis. For example, in certain embodiments, each sensor may be mounted between the wing toolbar and the respective wing support, and configured to output a signal indicative of an angle between the wing toolbar and the respective wing support. In certain embodiments, each sensor may include a rotary potentiometer, a linear potentiometer, a linear variable differential transformer (LVDT), or another suitable device configured to output a signal indicative of an angle of the wing toolbar.

In the illustrated embodiment, the electronic controller 84 includes a processor, such as the illustrated microprocessor 88, and a memory device 90. The electronic controller 84 may also include one or more storage devices and/or other suitable components. The processor 88 may be used to execute software, such as software for controlling a valve assembly 92, and so forth. Moreover, the processor 88 may include multiple microprocessors, one or more "general-purpose" microprocessors, one or more special-purpose microprocessors, and/or one or more application specific integrated circuits (ASICS), or some combination thereof. For example, the processor 88 may include one or more reduced instruction set (RISC) processors.

The memory device 90 may include a volatile memory, such as random access memory (RAM), and/or a nonvolatile memory, such as ROM. The memory device 90 may store a variety of information and may be used for various purposes. For example, the memory device 90 may store processor-executable instructions (e.g., firmware or software) for the processor 88 to execute, such as instructions for controlling the valve assembly 92. The storage device(s) (e.g., nonvolatile storage) may include read-only memory (ROM), flash memory, a hard drive, or any other suitable optical, magnetic, or solid-state storage medium, or a combination thereof. The storage device(s) may store data, instructions (e.g., software or firmware for controlling the valve assembly 92, etc.), and any other suitable information.

As illustrated, each hydraulic actuator is fluidly coupled to the valve assembly 92 of the hydraulic control system 86, and the valve assembly 92 is communicatively coupled to the electronic controller 84. The valve assembly 92 is configured to control fluid flow between a hydraulic fluid source and the hydraulic actuators based on control signals from the electronic controller 84. In the illustrated embodiment, the electronic controller 84 is configured to instruct the first wing actuator 58 (e.g., via the valve assembly 92) to rotate the first wing toolbar upwardly about the first wing axis while the toolbar assembly is in the raised position until the first angle of the first wing toolbar is greater than or equal to a first threshold angle (e.g., stored in the memory device 90). The first threshold angle corresponds to an angle of the first wing toolbar sufficient to disengage the first wing row units from the soil (e.g., about 1 degree to about 45 degrees, about 2 degrees to about 30 degrees, about 5 degrees to about 20 degrees, or about 15 degrees). The electronic controller 84 is also configured to instruct the second wing actuator 60 (e.g., via the valve assembly 92) to rotate the second wing toolbar upwardly about the second wing axis while the toolbar assembly is in the raised position until the second angle of the second wing toolbar is great than or equal to a second threshold angle (e.g., store in the memory device 90). The second threshold angle corresponds to an angle of the second wing toolbar sufficient to disengage the second wing row units from the soil (e.g., about 1 degree to about 45 degrees, about 2 degrees to about 30 degrees, about 5 degrees to about 20 degrees, or about 15 degrees). In certain embodiments, the first threshold angle may be the same as the second threshold angle. However, it should be appreciated that the first and second threshold angles may be different from one another.

Because the electronic controller 84 is configured to instruct the first and second wing actuators 58 and 60 to rotate the first and second wing toolbars, respectively, upwardly while the toolbar assembly 14 is in the raised position, wing wheels, which may be employed in certain agricultural implement systems to support the wing toolbars while the toolbar assembly is in the raised position, are obviated. Accordingly, as previously discussed, no ground engaging wheel is coupled to the first wing toolbar, and no ground engaging wheel is coupled to the second wing toolbar. Because the wing toolbars are not supported by ground engaging wheels, soil compaction, which may occur as wing wheels engage the soil (e.g., during a headland turn, during the transition to the transport position, etc.), may be substantially reduced or eliminated. In addition, the manufacturing costs associated with the agricultural implement system may be reduced due to a reduction in components. Furthermore, the weight reduction associated with the reduction in components may reduce soil compaction from the wheels coupled to the central toolbar.

In certain embodiments, the electronic controller 84 is also configured to control the transition of the wing toolbars from the working position to the transport position. For example, the electronic controller 84 may be configured to sequentially instruct (e.g., via the valve assembly 92) the wheel actuators 52 to move the toolbar assembly to the raised position, to instruct (e.g., via the valve assembly 92) the wing actuators 58 and 60 to rotate the wing toolbars until the first angle is greater than or equal to the first threshold angle and the second angle is greater than or equal to the second threshold angle, and to instruct (e.g., via the valve assembly 92) the wing support actuators 66 and 72 to rotate the wing toolbars and the wing supports to the transport position. Furthermore, while the wing toolbars and the wing supports are in the transport position, the electronic controller 84 may instruct (e.g., via the valve assembly 92) the wing actuators 58 and 60 to transition to a float mode, thereby enabling the tow bar assembly to support the wing toolbars and the wing supports. Similarly, the electronic controller 84 may be configured to transition the wing toolbars from the transport position to the working position. For example, the electronic controller 84 may be configured to sequentially instruct (e.g., via the valve assembly 92) the wing actuators 58 and 60 to rotate the wing toolbars until the first angle is greater than or equal to the first threshold angle and the second angle is greater than or equal to the second threshold angle, to instruct (e.g., via the valve assembly 92) the wing support actuators 66 and 72 to rotate the wing toolbars and the wing supports from the transport position to the working position, and to instruct (e.g., via the valve assembly 92) the wheel actuators 52 to move the toolbar assembly to the lowered position. Furthermore, while the toolbar assembly is in the lowered position, the electronic controller 84 may be configured to instruct (e.g., via the valve assembly 92) the wing actuators 58 and 60 to transition to a float mode or to urge the wing toolbars downwardly (e.g., depending on soil conditions).

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An agricultural implement system, comprising:
a tow bar assembly configured to couple the agricultural implement system to a tow vehicle;
a toolbar assembly comprising a first wing toolbar and a first wing support, wherein the first wing toolbar is configured to support a first row unit, the first wing toolbar is configured to rotate about a first axis relative to the first wing support to enable the toolbar assembly to bend in response to variations in a surface of soil, the first wing support is rotatably coupled to the tow bar assembly and configured to rotate about a second axis, different from the first axis, relative to the tow bar assembly to enable the first wing toolbar to transition between a working position, in which the first wing toolbar is substantially perpendicular to a direction of travel of the agricultural implement system, and a transport position, in which the first wing toolbar is folded forwardly along the direction of travel relative to the tow bar assembly, and no ground engaging wheel is directly coupled to the first wing toolbar via a respective wheel frame;
a first actuator configured to move the toolbar assembly between a lowered position and a raised position, wherein the first row unit is configured to engage the soil while the toolbar assembly is in the lowered position and the first wing toolbar is in the working position; and
a second actuator extending between the first wing support and the first wing toolbar, wherein the second actuator is configured to rotate the first wing toolbar upwardly about the first axis while the toolbar assembly is in the raised position such that the first row unit is disengaged from the soil, and the second actuator is configured to urge the first wing toolbar downwardly while the toolbar assembly is in the lowered position and the first wing toolbar is in the working position, such that the first row unit engages the soil; a first sensor configured to output a first signal indicative of a first angle of the first wing toolbar relative to the tow bar assembly about the first axis; a control system comprising an electronic controller, wherein the control system is coupled to the first actuator and to the second actuator, the electronic controller is communicatively coupled to the first sensor and configured to receive the first signal, and the electronic controller is configured to instruct the second actuator to rotate the first wing toolbar upwardly about the first axis while the toolbar assembly is in the raised position until the first angle of the first wing toolbar is greater than or equal to a first threshold angle in which the first row unit is disengaged from the soil.

2. The agricultural implement system of claim 1, wherein the first axis is substantially parallel to the direction of travel.

3. The agricultural implement system of claim 1, comprising a third actuator configured to drive the first wing toolbar to rotate between the working position and the transport position.

4. The agricultural implement system of claim 1, comprising a wheel coupled to the tow bar assembly by a tow bar wheel frame, wherein the first actuator is configured to rotate the tow bar wheel frame relative to the tow bar assembly.

5. The agricultural implement system of claim 1, wherein the toolbar assembly comprises a second wing toolbar configured to support a second row unit, the second wing toolbar is configured to rotate about a third axis relative to the tow bar assembly to enable the toolbar assembly to bend in respond to variations in the surface of the soil, the second wing toolbar is configured to rotate about a fourth axis, different from the third axis, relative to the tow bar assembly to enable the second wing toolbar to transition between a working position, in which the second wing toolbar is substantially perpendicular to the direction of travel, and a transport position, in which the second wing toolbar is folded forwardly along the direction of travel relative to the tow bar assembly, no ground engaging wheel is directly coupled to the second wing toolbar via a respective wheel frame, and the second row unit is configured to engage the soil while the toolbar assembly is in the lowered position and the second wing toolbar is in the working position.

6. The agricultural implement system of claim 5, comprising a fourth actuator configured to rotate the second wing toolbar upwardly about the third axis while the toolbar assembly is in the raised position such that the second row unit is disengaged from the soil.

7. The agricultural implement system of claim 6, wherein the fourth actuator is configured to urge the second wing toolbar downwardly while the toolbar assembly is in the lowered position and the second wing toolbar is in the working position, such that the second row unit engages the soil.

8. The agricultural implement system of claim 5, comprising a fifth actuator configured to drive the second wing toolbar to rotate between the working position and the transport position.

9. An agricultural implement system, comprising: a tow bar assembly configured to couple the agricultural implement system to a tow vehicle; a toolbar assembly comprising a first wing toolbar and a first wing support,
a first actuator configured to move the toolbar assembly between a lowered position and a raised position;
a second actuator configured to rotate the first wing toolbar of the toolbar assembly about a first axis relative to the tow bar assembly, wherein the first wing toolbar is configured to support a first row unit, the first wing toolbar is configured to rotate about the first axis to enable the toolbar assembly to bend in response to variations in a surface of soil, the first wing support is rotatably coupled to the tow bar assembly and is configured to rotate about a second axis, different from the first axis, between a working position, in which the first wing toolbar is substantially perpendicular to a direction of travel of the agricultural implement system, and a transport position, in which the first wing toolbar is folded forwardly along the direction of travel relative to the tow bar assembly, and no ground engaging wheel is directly coupled to the first wing toolbar via a respective wheel frame;

a first sensor configured to output a first signal indicative of a first angle of the first wing toolbar relative to the tow bar assembly about the first axis;

a hydraulic control system comprising an electronic controller, wherein the hydraulic control system is fluidly coupled to the first hydraulic actuator and to the second hydraulic actuator, the electronic controller is communicatively coupled to the first sensor and configured to receive the first signal, and the electronic controller is configured to instruct the second hydraulic actuator to rotate the first wing toolbar upwardly about the first axis while the toolbar assembly is in the raised position until the first angle of the first wing toolbar is greater than or equal to a first threshold angle in which the first row unit is disengaged from the soil.

10. The agricultural implement system of claim 9, comprising a third hydraulic actuator fluidly coupled to the hydraulic control system, wherein the third hydraulic actuator is configured to rotate the first wing toolbar about the second axis.

11. The agricultural implement system of claim 10, wherein the electronic controller is configured to sequentially instruct the first hydraulic actuator to move the toolbar assembly to the raised position, to instruct the second hydraulic actuator to rotate the first wing toolbar until the first angle of the first wing toolbar is greater than or equal to the first threshold angle, and to instruct the third hydraulic actuator to rotate the first wing toolbar to the transport position.

12. The agricultural implement system of claim 9, wherein the electronic controller is configured to instruct the second hydraulic actuator to transition to a float mode while the toolbar assembly is in the lowered position and the first wing toolbar is in the working position.

13. The agricultural implement system of claim 9, comprising:

a fourth hydraulic actuator configured to rotate a second wing toolbar of the toolbar assembly about a third axis relative to the tow bar assembly, wherein the second wing toolbar is configured to support a second row unit, the second wing toolbar is configured to rotate about the third axis to enable the toolbar assembly to bend in response to variations in the surface of the soil, the second wing toolbar is configured to rotate about a fourth axis, different from the third axis, between a working position, in which the second wing toolbar is substantially perpendicular to the direction of travel, and a transport position, in which the second wing toolbar is folded forwardly along the direction of travel relative to the tow bar assembly, and no ground engaging wheel is directly coupled to the second wing toolbar via a respective wheel frame; and a second sensor configured to output a second signal indicative of a second angle of the second wing toolbar relative to the tow bar assembly about the third axis;

wherein the hydraulic control system is fluidly coupled to the fourth hydraulic actuator, the electronic controller is communicatively coupled to the second sensor and configured to receive the second signal, and the electronic controller is configured to instruct the fourth hydraulic actuator to rotate the second wing toolbar upwardly about the third axis while the toolbar assembly is in the raised position until the second angle of the second wing toolbar is greater than or equal to a second threshold angle in which the second row unit is disengaged from the soil.

14. An agricultural implement system, comprising:

a tow bar assembly configured to couple the agricultural implement system to a tow vehicle;

a toolbar assembly comprising a first wing toolbar and a first wing support, wherein the first wing toolbar is configured to support a first row unit, the first wing toolbar is rotatably coupled to the first wing support, the first wing toolbar is configured to rotate about a first axis relative to the first wing support to enable the toolbar assembly to bend in response to variations in a surface of soil, the first wing support is rotatably coupled to the tow bar assembly and configured to rotate about a second axis, different from the first axis, relative to the tow bar assembly to enable the first wing toolbar to transition between a working position, in which the first wing toolbar is substantially perpendicular to a direction of travel of the agricultural implement system, and a transport position, in which the first wing toolbar is folded forwardly along the direction of travel relative to the tow bar assembly, and no ground engaging wheel is directly coupled to the first wing toolbar via a respective wheel frame;

a first actuator configured to move the toolbar assembly between a lowered position and a raised position, wherein the first row unit is configured to engage the soil while the toolbar assembly is in the lowered position and the first wing toolbar is in the working position; and a second actuator extending between the first wing support and the first wing toolbar, wherein the second actuator is configured to rotate the first wing toolbar upwardly about the first axis while the toolbar assembly is in the raised position such that the first row unit is disengaged from the soil; a first sensor configured to output a first signal indicative of a first angle of the first wing toolbar relative to the tow bar assembly about the first axis; a control system comprising an electronic controller, wherein the control system is coupled to the first actuator and to the second actuator, the electronic controller is communicatively coupled to the first sensor and configured to receive the first signal, and the electronic controller is configured to instruct the second actuator to rotate the first wing toolbar upwardly about the first axis while the toolbar assembly is in the raised position until the first angle of the first wing toolbar is greater than or equal to a first threshold angle in which the first row unit is disengaged from the soil.

15. The agricultural implement system of claim 14, wherein no ground engaging wheel is directly coupled to the first wing support via a respective wheel frame.

16. The agricultural implement system of claim 14, wherein the toolbar assembly comprises a second wing toolbar and a second wing support, wherein the second wing toolbar is configured to support a second row unit, the second wing toolbar is rotatably coupled to the second wing support, the second wing toolbar is configured to rotate about a third axis relative to the second wing support to enable the toolbar assembly to bend in response to variations in the surface of the soil, the second wing support is rotatably coupled to the tow bar assembly and configured to rotate about a fourth axis, different from the third axis, relative to the tow bar assembly to enable the second wing toolbar to transition between a working position, in which the second wing toolbar is substantially perpendicular to the direction of travel, and a transport position, in which the second wing toolbar is folded forwardly along the direction of travel relative to the tow bar assembly, and no ground engaging wheel is directly coupled to the second wing toolbar via a respective wheel frame.

17. The agricultural implement system of claim 16, comprising a fourth actuator configured to rotate the second wing toolbar upwardly about the third axis while the toolbar assembly is in the raised position such that the second row unit is disengaged from the soil.

18. The agricultural implement system of claim 14, comprising a central toolbar rigidly coupled to the tow bar assembly, wherein the central toolbar is configured to support a third row unit.

19. The agricultural implement system of claim 18, comprising a wheel coupled to the central toolbar by a wheel frame, wherein the first actuator is configured to rotate the wheel frame relative to the central toolbar.

* * * * *